April 20, 1965  P. J. MOLE  3,179,791
ILLUMINATING DEVICE FOR PRODUCING VARIED COLOR EFFECTS
Filed April 16, 1962
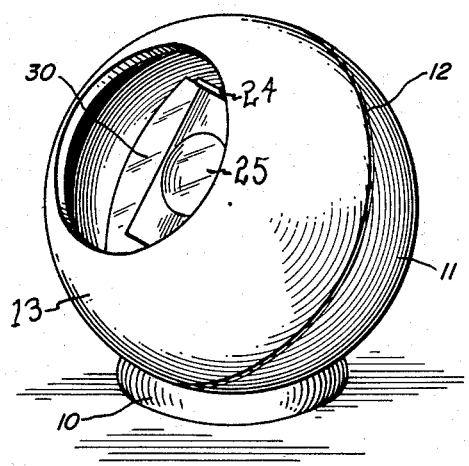
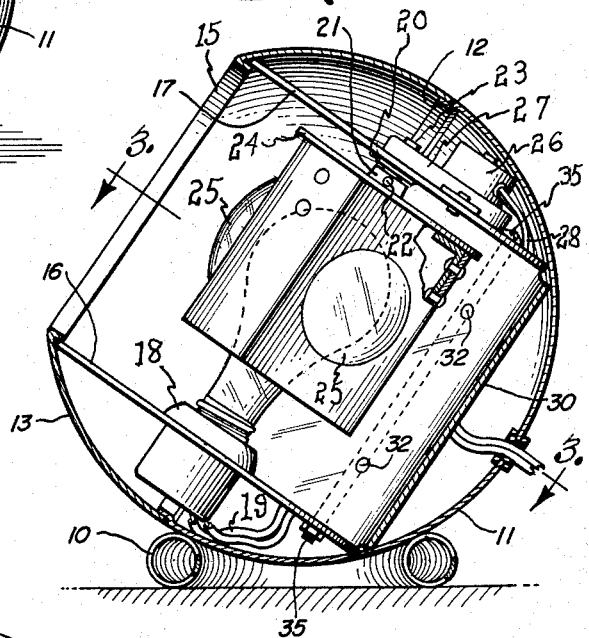
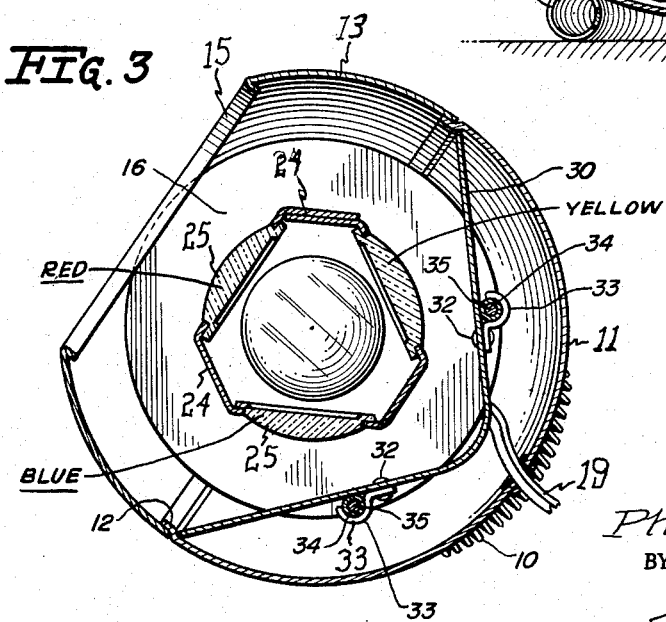
INVENTOR.
Philip J. Mole
BY John F. Brezina
Atty.

United States Patent Office 3,179,791
Patented Apr. 20, 1965

3,179,791
ILLUMINATING DEVICE FOR PRODUCING
VARIED COLOR EFFECTS
Philip J. Mole, 2517 N. 78th Ave., Elmwood Park, Ill.
Filed Apr. 16, 1962, Ser. No. 187,718
5 Claims. (Cl. 240—10.1)

This invention is directed to novel illuminating device which projects and blends moving and revolving multi-colored lighting effects which are adaptable for use in connection with either Christmas trees composed partly of reflective material or with advertising and merchandising displays.

It is an important object of my invention to provide a novel activated illuminating device which has a novel combination of structural features and arrangement of parts, which include means for selective control and change of lights of primary colors into the visible color spectrum to produce varied blends of colors by means of diffusion, transmission and reflection with the aid of plano-convex lens positioned beyond normal focus and at varying and specific angles of light incidence.

A further object of my invention is to provide novel means for producing a gradual blending of colored light rays from a light source, and which carries a plurality of speed apart colored lens which are adapted to rotate about a light source and adjacent to an angular reflector and to superposed rays of primary colors to create rays of different, unique and variegated colors and effects.

Further objects and accomplishments of my invention are to provide a light reflective device having means for rotatably mounting a plurality of spaced apart plano-convex colored lens behind a fixed lens and behind the normal focus of the latter to spread the projected light pattern; and which includes a reflector having uneven faces adapted to spread and diffuse the light rays projected therefrom.

Other and further important objects of my invention will be apparent from the following description and claims.

On the drawings—

FIG. 1 is an elevational view of my novel illuminating device showing the exterior thereof.

FIG. 2 is an enlarged cross section thereof taken on a vertical plane and showing parts in cross section.

FIG. 3 is a cross sectional view thereof taken substantially on a plane indicated by line 3—3 of FIG. 2.

As shown on the drawings numeral 10 designates a metal base of annular form and which preferably is made from metal tube stock. Numeral 11 is an apertured metal casing portion of substantially semi-spherical form having an integral annular offset flange 12. Numeral 13 designates a metal passaged annular casing portion having its periphery bent inwardly to form an annular flange 14 to form an aperture or opening 15.

Casing portion 13 is removably mounted upon the annular flange 12 as illustrated to provide a substantially spherical housing or casing, as illustrated.

Two substantially flat mounting plates 16 and 17 are mounted, for example by welding, in parallel positions and across the upper and lower interior portions of the casing, as illustrated in FIG. 2. The normally lower inclined mounting plate 16 has a large central aperture therein in which is mounted a suitable light socket 18 of non-conductive material, and whose electrical terminals are suitably connected by wires 19 to an electric supply source, only fragments of said wires being illustrated.

A standard electric light bulb is adapted to be mounted in said socket in the usual manner.

Mounted in the central aperture of the upper mounting plate 17 is a passaged journalling sleeve 20. Rotatably mounted on the inner portion of said journalling sleeve is a metal hub 21 in which is a threaded set screw 22, as illustrated. Journalled in the sleeve 20 is a short shaft or spindle 23 which extends through the mounting plate 17, and said mounting plate is suitably secured perpendicularly to the axis of said shaft.

Secured to the inner face of the mounting plate 17 is a multi-sided lens mounting member, preferably of metal, and which has a plurality of flat passaged wall portions in different planes, as illustrated in FIG. 3. Mounted in the apertures of the lens mounting member 24 are colored lens 25 of varied colors, these being preferably three in number and corresponding to the three primary colors blue, red, and orange.

Mounted upon the outer face of the upper mounting plate 17 by suitable rivets is an electric motor 26 having a speed reducing gear mechanism 27 operatively connected thereto. Said speed reducing mechanism 27 has the outer end of the shaft 23 extending through it and operatively connected to one of the gears of said reducing mechanism 27. Said motor has connected to it power supply wires 28, portions of which are shown in FIGS. 2 and 3, and which extend through a suitable non-conductive grommet mounted in a hole in the casing portion 11.

As illustrated in FIG. 3, an angularly bent reflector 30 preferably made of metal is mounted within the casing portion 11 so that its wing portions will reflect toward the aperture 15. Said mounting of said reflector is by means of a plurality of screws or rivets 32 which extend through holes in said reflector and into arcuate metal brackets or hooks 33. A pair of bars or rods 34 have their opposite ends secured by screws 35 in aligned holes in the peripheral edge portions of the two mounting plates 16 and 17, one of which screws 35 is partially illustrated in dotted lines in FIG. 2 and in cross section in FIG. 3. The arcuate portions of brackets 33 are mounted upon said cross bars 34 respectively to thereby hold said reflector 30 in the position illustrated in FIG. 3.

It will be understood that when the primary light source including the socket 18 and its light bulb, and the electric motor 26 are electrically connected to a power source, the motor 26 will cause the lens mounting member 24 to slowly rotate about the light bulb, with the result that the colored rays projected through the respective vari-colored lens 25, as well as the colored rays reflected from the angular reflector 30, will be projected through the aperture 15 upon the object being illuminated.

My invention construction described in the preferred form illustrated herein projects and blends revolving multi-colored lighting effects and provides variegated light displays which display varied arrangements of lights and colors by means of reflection, diffusion and projection of light rays through the respective optical plano-convex lens which are rotated about the primary light source described; namely the bulb in socket 18.

The driven rotation of the lens mounting member 24 causes a constant gradual changing of the primary colors of the lens 25 into the visible color spectrum. The rays reflected by the reflector 30 merge and blend with the rays directly passing through the multi-colored lens 25 to produce novel and beautiful color effects either on Christmas trees or other objects displayed.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing here-

I claim:

1. An illuminating device adaptable for use as a vari-colored flood light comprising in combination:
   an apertured casing;
   a pair of substantially parallel mounting plates, mounted in the casing,
   said mounting plates being mounted on opposite sides of the aperture;
   an electrical socket mounted in one of said plates adapted to receive a light bulb,
   a light bulb mounted in said socket;
   a lens mounting member, having three colored plano-convex lenses, rotatably mounted on one of said plates in said casing; and
   reflector means having two reflective surfaces disposed at approximately right angles to each other mounted on one of said mounting plates positioned so that the electric light bulb and rotatable lens mounting member are intermediate the reflector means and the aperture in the casing, said lens mounting member being mounted between said reflector means and said aperture and being rotatable about said light bulb.

2. An illuminating device adaptable for use as a vari-colored flood light comprising in combination:
   an apertured casing;
   a base means adapted to hold the casing on a flat surface;
   a pair of substantially parallel mounting plates, mounted in the casing,
   said mounting plates being mounted on opposite sides of the aperture;
   an electrical socket mounted in one of said plates adapted to receive a light bulb;
   a light bulb mounted in said socket,
   a lens mounting member, having a plurality of colored plano-convex lenses rotatably mounted on one of said plates in said casing; and
   reflector means having two reflective surfaces disposed at approximately right angles to each other mounted on one of said mounting plates positioned so that the electric light bulb and rotatable lens mounting member are intermediate the reflector means and the aperture in the casing, said lens mounting member being mounted between said reflector means and said aperture and being rotatable about said light bulb.

3. An illuminating device adaptable for use as a vari-colored flood light comprising in combination:
   an apertured casing;
   a base means adapted to hold the casing on a flat surface;
   a pair of substantially parallel mounting plates, mounted in the casing,
   said mounting plates being mounted on opposite sides of the aperture;
   an electrical socket mounted in one of said plates adapted to receive a light bulb;
   a light bulb mounted in said socket;
   a lens mounting member having three colored plano-convex lenses rotatably mounted on one of said plates in said casing; and
   reflector means having two reflective surfaces disposed at approximately right angles to each other mounted on one of said mounting plates positioned so that the electric light bulb and rotatable lens mounting member are intermediate the reflector means and the aperture in the casing, said lens mounting member being mounted between said reflector means and said aperture and being rotatable about said light bulb.

4. An illuminating device adaptable for use as a vari-colored flood light comprising in combination:
   an apertured casing;
   a base means adapted to hold the casing on a flat surface;
   a pair of substantially parallel mounting plates, mounted in the casing;
   said mounting plates being mounted on opposite sides of the aperture;
   an electrical socket mounted in one of said plates adapted to receive a light bulb;
   a light bulb mounted in said socket,
   a lens mounting member, having three colored plano-convex lenses rotatably mounted on one of said plates in said casing;
   reflector means having two reflective surfaces disposed at approximately right angles to each other mounted on one of said mounting plates in position so that the electric light bulb and rotatable lens mounting member are intermediate the reflector means and the aperture in the casing,
   said plano-convex lens having a focal length less than the distance from the center of the lens to the center of the light bulb, and said lens mounting member being mounted between said reflector means and said aperture and being rotatable about said light bulb.

5. An illuminating device adaptable for use as a vari-colored flood light comprising in combination:
   an apertured casing;
   a base means adapted to hold the casing on a flat surface;
   a pair of substantially parallel mounting plates, mounted in the casing;
   said mounting plates being mounted on opposite sides of the aperture;
   an electrical socket mounted in one of said plates adapted to receive a light bulb;
   a light bulb mounted in said socket,
   a lens mounting member, having three colored plano-convex lenses rotatably mounted on one of said plates in said casing;
   reflector means having two reflective surfaces disposed at approximately right angles to each other mounted on one of said mounting plates in position so that the electric light bulb and rotatable lens mounting member are intermediate the reflector means and the aperture in the casing,
   said plano-convex lens having a focal length less than the distance from the center of the lens to the center of the light bulb, and positioned on the lens mounting member so that their respective axes intersect each other at an angle of approximately 120 degrees, and said lens mounting member being mounted between said reflector means and said aperture and being rotatable about said light bulb.

References Cited by the Examiner

UNITED STATES PATENTS

| 1,655,468 | 1/28 | Lewis | 240—49 |
| 2,293,106 | 8/42 | Bourdakoff | 240—10.1 |
| 2,812,424 | 11/57 | Heugel | 240—10.1 |
| 3,013,145 | 12/61 | Trippe | 240—49 |

NORTON ANSHER, *Primary Examiner.*

GEORGE NINAS, JR., EVON C. BLUNK, *Examiners.*